United States Patent [19]

Sakaguchi et al.

[11] 4,006,272
[45] Feb. 1, 1977

[54] PROCESS FOR PREPARATION OF GLASS FIBER MATS

[75] Inventors: Kahei Sakaguchi; Masaaki Minakata; Kazutaka Yamashita; Fumiko Sugimoto, all of Wakayama, Japan

[73] Assignee: Kao Soap Co., Ltd., Tokyo, Japan

[22] Filed: Feb. 14, 1975

[21] Appl. No.: 549,917

[30] Foreign Application Priority Data

Feb. 28, 1974 Japan ................................ 49-23922

[52] U.S. Cl. ............................... 428/268; 427/195; 428/224; 428/290; 428/378; 428/394; 428/395; 260/873; 260/75 R

[51] Int. Cl.² .................. B32B 17/04; B32B 27/28

[58] Field of Search .......... 428/221, 224, 251, 265, 428/273, 290, 394, 395, 268, 378; 156/327; 427/195; 260/871, 75 R

[56] References Cited

UNITED STATES PATENTS

| 2,662,070 | 12/1953 | Kass et al. ........................ 260/871 |
| 2,688,580 | 9/1954 | Fingerhut ............................ 264/77 |
| 3,018,267 | 1/1962 | Steckler et al. .................... 428/251 |
| 3,340,083 | 9/1967 | Robitschek ........................ 428/221 |
| 3,441,466 | 4/1969 | Sterman et al. ................... 428/268 |
| 3,694,243 | 9/1972 | Campbell ........................... 427/195 |
| 3,930,091 | 12/1975 | Lewis et al. ........................ 428/268 |

Primary Examiner—George F. Lesmes
Assistant Examiner—Paul J. Thibodeau
Attorney, Agent, or Firm—Woodhams, Blanchard and Flynn

[57] ABSTRACT

A process for preparing resin-impregnated glass fiber mats in which the binder resin has a high rate of dissolution in vinyl monomers. The binder resin is a styrene resin or copolymer composed mainly of styrene, which has a melting point of 100° to 150° C. and a molecular weight of 2500 to 7000, or a mixture of said styrene resin or copolymer with an unsaturated polyester resin having a melting point of 80° to 130° C.

12 Claims, No Drawings

PROCESS FOR PREPARATION OF GLASS FIBER MATS

BACKGROUND OF THE INVENTION

1. Field of the Invention

This invention relates to a process for preparing glass fiber mats. More particularly, this invention relates to a process for preparing glass fiber mats in which the binder resin dissolves rapidly in vinyl monomers.

2. Description of the Prior Art

Glass fiber mats are widely used as reinforcements for fiber-reinforced plastics (FRP). Powders of unsaturated polyester resins have heretofore been used as binders for such glass fiber mats. When a powder of such unsaturated polyester resin is scattered on the glass fibers and the fibers are placed in an oven, the resin is melted and functions to bind the glass fibers to one another. In this manner, glass fiber mats are prepared on an industrial scale. A variety of glass fiber mats which differ in the rates of dissolution of their binder resins in vinyl monomers are required, depending on the molding methods for producing the FRP products. Further, glass fiber mats should have a tensile strength sufficient to withstand the molding operation. It is also required that the binder resin for glass fiber mats should have the property that a minimum amount thereof will impart a maximum strength to the mats.

As a means for lowering the rate of dissolution of binder resins in vinyl monomers, there has heretofore been adopted a method comprising incorporating in an unsaturated polyester resin from 1 to 3 wt. percent of a catalyst such as benzoyl peroxide and heating a mat impregnated therewith in an oven to cause a cross-linking reaction in the resin. As a means for increasing the dissolution rate, there has been adopted a method in which the chemical composition of the unsaturated polyester resin is changed. However, when an unsaturated polyester resin alone is used as the binder, it is essentially impossible to increase the rate of dissolution of the binder in vinyl monomers beyond a certain limit.

It is therefore a primary object of this invention to provide a process for preparing glass fiber mats using a binder resin having a very high rate of dissolution in vinyl monomers.

SUMMARY OF THE INVENTION

In accordance with this invention, there is provided a process for the preparation of glass fiber mats characterized in that a styrene resin or copolymer composed of at least 50 mole percent of styrene units, which has a molecular weight of 2500 to 7000, and a melting point of 100° to 150° C., or a mixture of said styrene resin or copolymer with an unsaturated polyester resin, is used as a binder having a high rate of dissolution in vinyl monomers, whereby the strength of the resulting mat is significantly improved.

We have discovered that when a styrene resin or a copolymer composed of at least 50 mole percent of styrene, which has a molecular weight (number average molecular weight; the same shall apply hereinafter) of 2500 to 7000, preferably 3000 to 6000, and a melting point of 100° to 150° C., or a mixture of said styrene resin or copolymer with an unsaturated polyester resin having a melting point of 80° to 130° C., is used as the binder for glass fiber mats, a glass fiber mat having a very high rate of dissolution in vinyl monomers can be obtained.

The styrene homopolymer or the copolymer composed mainly of styrene, which is used as the binder in this invention, can be prepared by conventional bulk polymerization and emulsion polymerization methods. Styrene homopolymers or copolymers suitable for attaining the objects of this invention have a molecular weight of from 2500 to 7000, preferably from 3000 to 6000, and a melting point of 100° to 150° C. Styrene resins having a higher molecular weight, for example, styrene homopolymers and copolymers having a molecular weight of 50000 to 100000, which are customarily used for molding purposes, are not suitable in this invention.

The styrene homopolymer that can be used in this invention includes styrene homopolymers having a relatively low molecular weight, i.e., from 2500 to 7000. In the styrene copolymers that can be used in this invention, the concentration of styrene units in the polymer molecule should be at least 50 mole percent, preferably at least 70 mole percent. As the monomers that can be copolymerized with styrene, there can be used various monomers known to be copolymerizable with styrene, for example, α-methylstyrene, acrylonitrile, methyl methacrylate, ethyl acrylate, vinyltoluene and butadiene. In general, styrene homopolymers, namely, styrene resins prepared by homopolymerization of styrene, are more readily available than styrene copolymers, and therefore, they are used more frequently in this invention.

Such styrene resins and styrene copolymers can easily be pulverized to a particle size smaller than 40 mesh (JIS) by means of a suitable fine pulverizer or the like.

When there is used as the binder resin for the glass fiber mat a mixture of (1) such styrene resin or copolymer having a molecular weight of 2500 to 7000, with (2) an unsaturated polyester resin, the content of the styrene resin or copolymer in the mixture is at least 25 percent by weight based on the total weight of the binder. This mixture also has the effect of increasing greatly the rate of dissolution of the binder in the resulting glass fiber mat in vinyl monomers.

The unsaturated polyester resins that can be used in combination with the styrene resin or copolymer in this invention include those polyester resins having a melting point (as measured by the ring and ball method according to ASTM E28-58T; the same shall apply hereinafter) of 80° to 130° C. These unsaturated polyester resins are prepared by the polycondensation reaction of a polyol and a polycarboxylic acid including an α,β-unsaturated dicarboxylic acid. As the polyol component, there can be employed ethylene glycol, diethylene glycol, propylene glycol, neopentyl glycol, butane diol, trimethylpentane diol, hydrogenated bisphenol A and diols having the following formula:

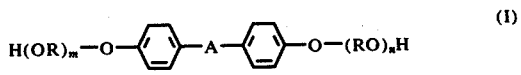

(I)

wherein R is alkylene having 2 or 3 carbon atoms,
A is a 2-alkylidene group having 3 or 4 carbon atoms,
and n and m are integers not less than 1, with the proviso that the average value of the sum of m and n does not exceed 3.

These polyol components can be used singly or in the form of a mixture of two or more of them. When a diol of the above formula (I) is employed as a polyol, the polyol component to be used is composed of (a) 45 to 100 mole percent of a diol of the formula (I), (b) 0 to 10 mole percent of an aliphatic polyhydric alcohol having from 3 to 6 carbon atoms and at least 3 hydroxyl groups and (c) 0 to 55 mole percent of a diol other than diols reparesented by the formula (I).

As the polycarboxylic acid component, an $\alpha,\beta$-unsaturated dicarboxylic acid or its anhydride is used alone or in the form of a mixture thereof, with up to 80 mole percent of a saturated aliphatic dicarboxylic acid or aromatic dicarboxylic acid. As the $\alpha,\beta$-unsaturated dicarboxylic acid or its anhydride, there can be mentioned maleic acid, maleic anhydride, fumaric acid, itaconic acid and the like. Use of fumaric acid and maleic anhydride is especially preferred from the industrial viewpoint. As the saturated dicarboxylic acid, there can be mentioned aliphatic dicarboxylic acids such as succinic acid, adipic acid, azelaic acid and sebacic acid, and aromatic dicarboxylic acids such as phthalic acid, phthalic anhydride, tetrahydrophthalic acid, tetrahydrophthalic acid anhydride, isophthalic acid, terephthalic acid, methylisophthalic acid and methylterephthalic acid.

In the polycondensation reaction between the above polyol and polycarboxylic acid, the polyol component is used in an amount of 0.8 to 1.2 moles per mole of the polycarboxylic acid component, and the reaction is carried out at a temperature ranging from 180° to 2101° C., in an inert gas atmosphere. A typical example of the process for the preparation of unsaturated polyester resins using a diol of the formula (I) is disclosed in U.S. Pat. No. 2,662,070. A further example of a process for preparing an unsaturated polyester resin that can be used as a glass fiber binder, from neopentyl glycol and isophthalic acid as starting materials, is disclosed in U.S. Pat. No. 3,340,083. The unsaturated polyester resins used in this invention can be prepared by the processes disclosed in these patents. The thus-prepared unsaturated polyester resins can easily be pulverized into powders having a size smaller than 40 mesh by means of a fine pulverizer or the like.

In this invention, when there is used as the binder a mixture of the styrene resin or styrene copolymer with the unsaturated polyester resin, the following two methods can be adopted for mixing the two components:

a. A powder of an unsaturated polyester resin and a powder of a styrene resin or styrene copolymer are mixed together by means of a V-type blender, a ribbon blender or the like.

b. A styrene resin or styrene copolymer is placed into an unsaturated polyester resin in the as-prepared molten state just after the polycondensation reaction is completed, and the styrene resin or copolymer is melted and mixed into the polyester resin. The resulting molten mixture is solidified by cooling and is pulverized to a powder of a size smaller than 40 mesh by means of a fine pulverizer.

In this invention, it is preferred that the resin used as the binder be in such a particulate state that the particle size distribution is whthin the range of from 40 to 200 mesh and the majority of particles have sizes in the range of from 60 to 100 mesh.

In preparing glass fiber mats, the binder is used in the dry powder state and is uniformly distributed on the glass fiber substrate. It is also possible to apply the powdery binder in the state of a dispersion thereof in water. In this latter case it is preferred that the particle size of the binder be 200 mesh or finer.

When the binder is applied in the dry powder state, in order to improve the flowability of the powder and to prevent caking or agglomeration of the powder, a higher fatty acid metal salt or finely divided silica can be added as a lubricant in an amount not exceeding 2 wt. percent.

The preparation of glass fiber mats using the resin binder composition of this invention can be performed according to conventional methods. For instance, the following method can be adopted.

A glass material for making glass fibers is first melted and spun into filaments having a diameter of 9 to 13 $\mu$ from the bottom of a crucible, employing platinum bushings. Then, 200 to 400 of the thus-obtained filaments are gathered into a strand by treating them with a sizing agent and the resulting strand is wound and is dried. Each strand can be used directly for the preparation of a glass fiber mat, or 40 to 60 of such strands can be formed into a roving and the roving is used for the preparation of a glass fiber mat.

Processes for the preparation of glass fiber mats are divided into two types. According to one method, there is used a chopped strand formed by cutting a strand or roving into staples having a length of 25 to 50 mm, and the resulting product obtained by using such chopped strand is called a "chopped strand mat." In the other method, the strands are not cut but are used in a continuous form for the production of a mat, and this product is called a "continuous strand mat" or "swirl mat."

According to this invention, a glass fiber mat is prepared by using a conventional continuous mat-preparing machine. Chopped strands or continuous strands are placed to form a layer on the running belt of the machine, and the resin binder composition of this invention is uniformly applied on the fiber layer. The amount of the resin binder composition applied to the glass fibers is 2.5 to 10 percent by weight, preferably 3 to 6 percent by weight. When the applied amount of the binder resin is less than 2.5 percent by weight, a mat-like form cannot be retained. When the applied amount of the binder resin is larger than 10 percent by weight, the tensile strength of the mat is sufficiently high but the rate of dissolution of the binder in styrene is drastically lowered. Then, the resin-impregnated layer is transferred into an oven maintained at 180° to 240° C. by the running belt and is discharged from the oven after a retention time therein of 2 to 3 minutes. Immediately thereafter, the layer is compressed by a cooling roll and wound to form a glass fiber mat.

The glass fiber mat prepared according to this invention is used as a reinforcement in the fabrication of FRP products. More specifically, in accordance with conventional procedure, an unsaturated polyester resin or vinyl ester resin, as the matrix resin component for preparing the FRP, is dissolved in a vinyl monomer, the above glass fiber mat is immersed in the thus-formed solution, and the matrix resin is cured at a low pressure in the presence of a catalyst at room temperature or at an elevated temperature to prepare a FRP product.

The use of the glass fiber mat of this invention whose binder can rapidly be dissolved in vinyl monomers results in the following advantages.

The binder in the glass fiber mat is rapidly dissolved in the vinyl monomer of the vinyl monomer solution containing the matrix resin dissolved therein, and therefore, the glass fibers exhibit a good moldability to conform closely with the shape of the mold in a very short time and they are rapidly impregnated with the matrix resin. As a result, the molding time can be greatly shortened.

Another advantage attained by the use of the glass fiber mat of this invention is that in the process of preparing planar plates or undulating plates or sheets of FRP molded articles at a high speed by using glass fiber mats, because the resin used as the binder for the glass fiber mats is rapidly dissolved in the vinyl monomer, the molding speed can be greatly increased.

When the rate of dissolution of the binder resin in vinyl monomers is low, the matrix resin is cured before the binder is completely dissolved by the vinyl monomer in the matrix resin, and therefore, spots of the binder resin appear in the laminate structure formed by curing and the transparency of the laminate is lost.

Accordingly, still another advantage attained by the use of the glass fiber mat of this invention is that a laminate excellent in transparency can be obtained.

The vinyl monomers used in making the FRP products as described above includes styrene, vinyltoluene, α-methylstyrene, chlorostyrene, methyl methacrylate and mixtures thereof.

In evaluating the properties of glass fiber mats such as those prepared according to the process of this invention, the uniformity of the weight and the uniformity of the distribution of the binder resin applied to the mat are important. In this invention, products which are satisfactory in these two points were evaluated with respect to their solubility in styrene and the tensile strength of the mat.

The styrene solubility of glass fiber mats obtained according to this invention was determined by the following method:

A glass fiber mat was cut into a size of 12.5 cm × 10 cm, and the upper and lower ends of the sample were fixed by clips which were similar in the size. A weight was hung on the lower clip so that the total weight including the weight of the clips was 100 ± 1 g. Then, the upper clip was picked up with the fingers and the mat was immersed in a styrene-filled tank maintained at 25°C. Simultaneously, the upper clip was fixed to a supporting rod. The time required for the glass fiber mat to be broken or lose its structural integrity by dissolution of the applied binder resin in styrene was measured, and the styrene solubility of the glass fiber mat was expressed by the thus-measured time.

The tensile strength was determined according to the following method:

A sample mat was cut into a test piece having a width of 10 cm and a length of 25 cm, and the test piece was pulled in the longitudinal direction. The tensile strength is expressed as the load when the test piece broke. The measurement was conducted by using an autograph manufactured by Shimazu Seisakusho K. K. and the sample was pulled at a cross head speed of 20 cm/min.

In the above styrene solubility and tensile strength tests, 10 samples were tested with respect to each glass fiber mat and the averages of the ten values is reported as the test values.

Glass fiber mats which exhibit a value of 30 to 60 seconds in the styrene solubility test are standard products used for the hand lay-up method. Each of the glass fiber mats prepared by using the binder of this invention has a styrene solubility test value of 20 seconds or less. Thus, it has been confirmed that mats prepared according to this invention have a very high rate of dissolution in styrene. Further, each of the glass fiber mats prepared by using the binder of this invention has a tensile strength higher than 10 Kg. This is sufficient for practical purposes.

This invention will now be further described in more detail by reference to the following illustrative Examples. In the following Examples all references to "parts" and "percent" are by weight.

PREPARATION OF UNSATURATED POLYESTER RESIN A

A reaction vessel equipped with an agitator, a thermometer, a nitrogen introduction tube and a dehydrator was charged with 710 g (96 mole percent) of 2,2-di-(β-hydroxyethoxyphenyl)propane, 267 g (100 mole percent) of fumaric acid, 8.47 g (4 mole percent) of glycerine and 0.18 g of hydroquinone, and they were reacted in a nitrogen current at 180 to 210° C. while removing the water formed by the reaction by distillation, until the acid value of the product was lower than 20, thereby to obtain an unsaturated polyester resin A having a melting point of 120° C.

PREPARATION OF UNSATURATED POLYESTER RESIN B

The same reaction vessel as used for the preparation of the unsaturated polyester resin A was charged with 325 g (1.0 mole) of 2,2-di-(β-hydroxyethoxyphenyl)-propane, 116 g (1.0 mole) of fumaric acid and 0.22 g of hydroquinone, and they were reacted in a nitrogen current at 180° to 210° C. until the acid value of the product was lower than 20, thereby to obtain an unsaturated polyester resin B having a melting point of 120° C.

PREPARATION OF UNSATURATED POLYESTER RESIN C

The same reaction vessel as used for the preparation of the unsaturated polyester resin A was charged with 589 g (55 mole percent) of 2,2-di(β-hydroxypropoxyphenyl)-propane, 62 g (50 mole percent) of ethylene glycol, 232 g (100 mole percent) of fumaric acid and 0.35 g of hydroquinone, and they were reacted at 180° to 2101° C. until the acid value of the product was lower than 20, thereby to obtain an unsaturated polyester resin C having a melting point of 112° C.

PREPARATION OF UNSATURATED POLYESTER RESIN D

The same reaction vessel as used for the preparation of the unsaturated polyester resin A was charged with 743 g (105 mole percent) of 2,2-di-(β-hydroxypropoxyphenyl)propane, 232 g (100 mole percent) of fumaric acid and 0.39 g of hydroquinone, and they were reacted at 180° to 210° C in a nitrogen current until the acid value of the product was lower than 20, thereby to obtain an unsaturated polyester resin D having a melting point of 118° C.

PREPARATION OF UNSATURATED POLYESTER RESIN E

The same reaction vessel as used for the preparation of the unsaturated polyester resin A was charged with 604 g (5.78 moles) of neopentyl glycol, 120 g (1.13 moles) of diethylene glycol, 222 g (2.18 moles) of maleic anhydride, 754 g (4.53 moles) of isophthalic acid and 0.51 g of hydroquinone, and they were reacted in a nitrogen current at 180° to 210° C. to obtain an unsaturated polyester resin E having an acid value of 13 and a melting point of 116° C.

PREPARATION OF UNSATURATED POLYESTER RESIN F

The same reaction vessel as used for the preparation of the unsaturated polyester resin A was charged with 319 g (4.2 moles) of propylene glycol, 444 g (3.0 moles) of phthalic anhydride, 98 g (1.0 mole) of maleic anhydride and 0.34 g of hydroquinone, and they were reacted in a nitrogen current at 180° to 210° C. to obtain an unsaturated polyester resin F having an acid value of 24 and a melting point of 81° C.

PREPARATION OF UNSATURATED POLYESTER RESIN G

The same reaction vessel as used for the preparation of the unsaturated polyester resin A was charged with 319 g (4.2 moles) of propylene glycol, 498 g (3.0 moles) of isophthalic acid, 98 g (1.0 mole) of maleic anhydride and 0.37 g of hydroquinone, and they were reacted in a nitrogen current at 180° to 210° C. to obtain an unsaturated polyester resin G having an acid value of 22 and a melting point of 106° C.

STYRENE RESIN

The following three styrene resins prepared according to the bulk polymerization method were employed:

|  | Melting Point (° C) | Molecular Weight |
|---|---|---|
| Styrene Resin X | 127 | 6000 |
| Styrene Resin Y | 146 | 5000 |
| Styrene Resin z | 127 | 3000 |

COMPARATIVE EXAMPLE 1 AND EXAMPLES 1 TO 4

According to the method described above, various glass fiber chopped strand mats were prepared by using as the binder the unsaturated polyester resin A and styrene resin X (the unit weight of each mat being 450 g/m$^2$). These mats were subjected to the styrene solubility and tensile strength tests to obtain the results shown in Table 1. In each mat, the applied amount of the binder resin was 4.5 percent by weight based on the glass fibers. From the results shown in Table 1, it will readily be understood that when a mixture of the unsaturated polyester resin A and sytrene resin X was used, the resulting mat had a higher rate of dissolution in styrene than in the case where the unsaturated polyester resin A alone was used as the binder.

Table 1

|  | Binder Resin Composition | | Properties of Chopped Strand Mat | |
|---|---|---|---|---|
|  | Unsaturated Polyester Resin A (parts) | Styrene Resin X (parts) | Styrene Solubility (seconds) | Tensile Strength (Kg) |
| Comparative Example 1 | 100 | 0 | 60 | 25 |
| Example 1 | 75 | 25 | 20 | 25 |
| Example 2 | 50 | 50 | 15 | 26 |
| Example 3 | 25 | 75 | 10 | 28 |
| Example 4 | 0 | 100 | 5 | 28 |

COMPARATIVE EXAMPLE 2 AND EXAMPLES 5 TO 8

According to the method described above, various glass fiber continuous strand mats (having a unit weight of 300 g/m$^2$) were prepared by employing as the binder the unsaturated polyester resin A and styrene resin X. These glass fiber mats were subjected to the styrene solubility and tensile strength tests to obtain results shown in Table 2. In each glass fiber mat, the applied amount of the binder was 5.5 percent by weight based on the glass fibers.

Table 2

|  | Binder Resin Composition | | Properties of Continuous Strand Mat | |
|---|---|---|---|---|
|  | Unsaturated Polyester Resin A (parts) | Styrene Resin X (parts) | Styrene Solubility (seconds) | Tensile Strength (Kg) |
| Comparative Example 2 | 100 | 0 | 60 | 12 |
| Example 5 | 75 | 25 | 20 | 14 |
| Example 6 | 50 | 50 | 15 | 15 |
| Example 7 | 25 | 75 | 7 | 16 |
| Example 8 | 0 | 100 | 5 | 16 |

COMPARATIVE EXAMPLE 3 AND EXAMPLES 9 TO 12

According to the method described above, various glass fiber chopped strand mats (having a unit weight of 450 Kg/m$^2$ were prepared by using the unsaturated polyester resin A and styrene resin Z. These glass fiber mats were subjected to the styrene solubility and tensile tests to obtain the results shown in Table 3. In each mat, the applied amount of the binder was 4.5 percent by weight based on the glass fibers.

Table 3

|  | Binder Resin Composition | | Properties of Chopped Strand Mat | |
| --- | --- | --- | --- | --- |
|  | Unsaturated Polyester Resin A (parts) | Styrene Resin Z (parts) | Styrene Solubility (seconds) | Tensile Strength (Kg) |
| Comparative Example 3* | 100 | 0 | 60 | 25 |
| Example 9 | 75 | 25 | 18 | 20 |
| Example 10 | 50 | 50 | 15 | 18 |
| Example 11 | 25 | 75 | 10 | 15 |
| Example 12 | 0 | 100 | 5 | 12 |

*same as Comparative Example 1

COMPARATIVE EXAMPLE 4 AND EXAMPLES 13 TO 16

According to the method described above, various glass fiber chopped strand mats (having a unit weight of 450 g/m$^2$) were prepared by using as the binder the unsaturated polyester resin B and styrene resin X, and these mats were subjected to the styrene solubility and tensile strength tests to obtain the results shown in Table 4. In each mat, the applied amount of the binder was 4.5 percent by weight based on the glass fibers.

Table 4

|  | Binder Resin Composition | | Properties of Chopped Strand Mat | |
| --- | --- | --- | --- | --- |
|  | Unsaturated Polyester Resin B (parts) | Styrene Resin X (parts) | Styrene Solubility (seconds) | Tensile Strength (Kg) |
| Comparative Example 4 | 100 | 0 | 52 | 24 |
| Example 13 | 75 | 25 | 18 | 25 |
| Example 14 | 50 | 50 | 12 | 28 |
| Example 15 | 25 | 75 | 7 | 29 |
| Example 16* | 0 | 100 | 5 | 28 |

*same as Example 4

COMPARATIVE EXAMPLE 5 AND EXAMPLES 17 TO 20

According to the method described above, various glass fiber chopped strand mats (having a unit weight of 450 g/m$^2$) were prepared by using as the binder the unsaturated polyester resin C and styrene resin X, and these mats were subjected to the styrene solubility and tensile strength tests to obtain the results shown in Table 5. In each mat, the applied amount of the binder was 4.5 percent by weight based on the glass fibers.

Table 5

|  | Binder Resin Composition | | Properties of Chopped Strand Mat | |
| --- | --- | --- | --- | --- |
|  | Unsaturated Polyester Resin C (parts) | Styrene Resin X (parts) | Styrene Solubility (seconds) | Tensile Strength (Kg) |
| Comparative Example 5 | 100 | 0 | 44 | 20 |
| Example 17 | 75 | 25 | 20 | 22 |
| Example 18 | 50 | 50 | 15 | 23 |
| Example 19 | 25 | 75 | 7 | 26 |
| Example 20* | 0 | 100 | 5 | 28 |

*same as Example 4

COMPARATIVE EXAMPLE 6 AND EXAMPLES 21 TO 24

According to the method described above, various glass fiber chopped strand mats (having a unit weight of 450 g/m$^2$) were prepared by using as the binder the unsaturated polyester resin D and styrene resin X, and these mats were subjected to the styrene solubility and tensile strength tests to obtain the results shown in Table 6. In each mat, the applied amount of the binder was 4.5 percent by weight based on the glass fiber.

Table 6

|  | Binder Resin Composition | | Properties of Chopped Strand Mat | |
| --- | --- | --- | --- | --- |
|  | Unsaturated Polyester Resin D (parts) | Styrene Resin X (parts) | Styrene Solubility (seconds) | Tensile Strength (Kg) |
| Comparative Example 6 | 100 | 0 | 40 | 15 |
| Example 21 | 75 | 25 | 18 | 16 |
| Example 22 | 50 | 50 | 12 | 18 |
| Example 23 | 25 | 75 | 8 | 24 |

Table 6-continued

| | Binder Resin Composition | | Properties of Chopped Strand Mat | |
|---|---|---|---|---|
| | Unsaturated Polyester Resin D (parts) | Styrene Resin X (parts) | Styrene Solubility (seconds) | Tensile Strength (Kg) |
| Example 24* | 0 | 100 | 5 | 28 |

*same as Example 4

COMPARATIVE EXAMPLE 7 AND EXAMPLES 25 TO 28

According to the method described above, various glass fiber chopped strand mats (having a unit weight of 450 g/m$^2$) were prepared by using as the binder the unsaturated polyester resin E and styrene resin X, and these mats were subjected to the styrene solubility and tensile strength tests to obtain the results shown in Table 7. In each mat, the applied amount of the binder was 4.5 percent by weight based on the glass fibers.

Table 7

| | Binder Resin Composition | | Properties of Chopped Strand Mats | |
|---|---|---|---|---|
| | Unsaturated Polyester Resin E (parts) | Styrene Resin X (parts) | Styrene Solubility (seconds) | Tensile Strength (Kg) |
| Comparative Example 7 | 100 | 0 | 45 | 18 |
| Example 25 | 75 | 25 | 20 | 20 |
| Example 26 | 50 | 50 | 10 | 25 |
| Example 27 | 25 | 75 | 8 | 28 |
| Example 28* | 0 | 100 | 5 | 28 |

*same as Example 4

COMPARATIVE EXAMPLE 8 AND EXAMPLES 29 TO 32

According to the method described above, various glass fiber chopped strand mats (having a unit weight of 450 g/m$^2$) were prepared by using as the binder the unsaturated polyester resin F and styrene resin Y, and these mats were subjected to the styrene solubility and tensile strength tests to obtain the results shown in Table 8. In each mat, the applied amount of the binder was 5.5 percent by weight based on the glass fibers.

Table 8

| | Binder Resin Composition | | Properties of Chopped Strand Mat | |
|---|---|---|---|---|
| | Unsaturated Polyester Resin F (parts) | Styrene Resin Y (parts) | Styrene Solubility (seconds) | Tensile Strength (Kg) |
| Comparative Example 8 | 100 | 0 | 45 | 8 |
| Example 29 | 75 | 25 | 20 | 12 |
| Example 30 | 50 | 50 | 10 | 15 |
| Example 31 | 25 | 75 | 9 | 20 |
| Example 32 | 0 | 100 | 6 | 20 |

COMPARATIVE EXAMPLE 9 AND EXAMPLES 33 to 36

According to the method described above, various glass fiber chopped strand mats (having a unit weight of 450 g/m$^2$) were prepared by using as the binder the unsaturated polyester resin G and styrene resin Y, and these mats were subjected to the styrene solubility and tensile strength tests to obtain the results shown in Table 9. In each mat, the applied amount of the binder was 5.0 percent by weight based on the glass fiber.

Table 9

| | Biner Resin Composition | | Properties of Chopped Strand Mat | |
|---|---|---|---|---|
| | Unsaturated Polyester Resin G (parts) | Styrene Resin Y (parts) | Styrene Solubility (seconds) | Tensile Strength (Kg) |
| Comparative Example 9 | 100 | 0 | 47 | 10 |
| Example 33 | 75 | 25 | 20 | 12 |
| Example 34 | 50 | 50 | 10 | 15 |
| Example 35 | 25 | 75 | 8 | 18 |
| Example 36* | 0 | 100 | 6 | 20 |

*same as Example 32

The embodiments of the invention in which an exclusive property or privilege is claimed are defined as follows:

1. A process for preparing a resin-bonded glass fiber mat in which the resin has a rapid rate of dissolution in vinyl monomers, which consists essentially of:

incorporating in a glass fiber mat from 2.5 to 10 percent by weight, based on the weight of the glass fibers, of particles of a binder resin consisting of
  A. from 25 to 100 percent by weight of polystyrene or a copolymer of styrene and at least one comonomer copolymerizable with styrene selected from the group consisting of α-methylstyrene, acrylonitrile, methyl methacrylate, ethyl acrylate, vinyl toluene and butadiene, said copolymer containing at least 50 mole percent of styrene units, said component A having a melting point of 100° to 150° C and having a number average molecular weight of 2500 to 7000, and
  B. the balance of zero to 75 percent by weight of said binder resin is an unsaturated polyester resin having a melting point of 80° to 130° C,
  then heating said glass fiber mat havng said binder resin particles incorporated therein to melt the resin and adhere it to the glass fibers, and then cooling said mat.

2. A process in accordance with claim 1, in which said particles have a particle size of less than 40 mesh.

3. A process in accordance with claim 1 in which said mat is heated at from about 180° to 240° C for from about 2 to 3 minutes to melt said resin.

4. A process in accordance with claim 1, in which said unsaturated polyester resin is obtained by reacting (1) a dicarboxylic acid component consisting essentially of from 20 to 100 molar percent of at least one α,β-ethylenically unsaturated carboxylic acid or anhydride thereof, and the balance is at least one aliphatic or aromatic dicarboxylic acid or anhydride thereof, with (2) one or more polyesterforming polyols.

5. A process in accordance with claim 4 in which said α,β-unsaturated dicarboxylic acid is selected from the group consisting of maleic acid, maleic anhydride, fumaric acid and itaconic acid.

6. A process in accordance with claim 1 in which said component A has a molecular weight of 3000 to 6000.

7. A process in accordance with claim 1 in which component A consists of polystyrene.

8. A process in accordance with claim 1 in which only a binder resin consisting of component A and component B is incorporated in said mat.

9. A resin-bonded glass fiber mat having a rapid rate of dissolution in vinyl monomers, which consists essentially of:
  a glass fiber mat having adhered thereto and substantially uniformly distributed thereon from 2.5 to 10 percent by weight, based on the weight of the glass fibers, of a binder resin consisting of
  A. from 25 to 100 percent by weight of polystyrene or a copolymer of styrene and at least one comonomer copolymerizable with styrene selected from the group consisting of α-methylstyrene, acrylonitrile, methyl methacrylate, ethyl acrylate, vinyl toluene and butadiene, said copolymer containing at least 50 mole % of styrene units, said component A having a melting point of 100° to 150° C and having a number average molecular weight of 2500 to 7000, and
  B. the balance of zero to 75 percent by weight of said binder resin is an unsaturated polyester resin having a melting point of 80° to 130° C.

10. A resin-bonded glass fiber mat in accordance with claim 9 consisting of said glass fiber mat, component A and component B.

11. A process for preparing a fiber reinforced plastic article comprising placing in a liquid solution of an unsaturated polyester matrix resin or a vinyl ester matrix resin dissolved in a vinyl monomer, at least one resin-bonded glass fiber mat as claimed in claim 3 molding the assemblage of said solution and mat, and curing said resin in the presence of a catalyst to obtain said fiber reinforced plastic article.

12. A fiber reinforced plastic article prepared by the process of claim 11.

* * * * *